Aug. 29, 1967 C. W. HORSTING 3,338,753
GERMANIUM-SILICON THERMOELEMENT HAVING FUSED TUNGSTEN CONTACT
Original Filed May 20, 1964 3 Sheets-Sheet 1
Fig. 1.
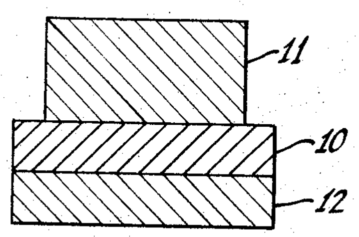
Fig. 2.
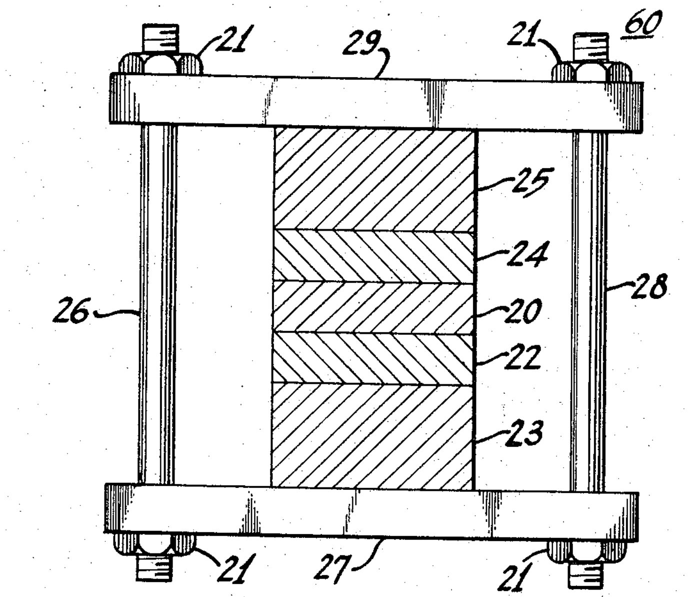
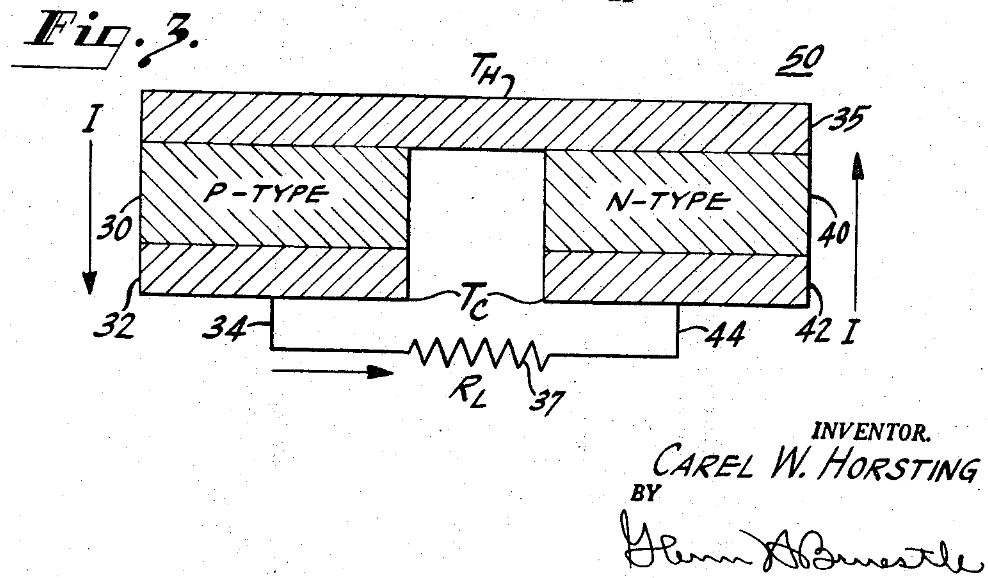
INVENTOR.
CAREL W. HORSTING
BY
[signature]

INVENTOR
CAREL W. HORSTING
BY Glenn H. Bruestle

INVENTOR.
CAREL W. HORSTING
BY
Glenn H. Bramhall 3,338,753
Patented Aug. 29, 1967

3,338,753

GERMANIUM-SILICON THERMOELEMENT HAVING FUSED TUNGSTEN CONTACT

Carel W. Horsting, Caldwell, N.J., assignor to Radio Corporation of America, a corporation of Delaware Application May 20, 1964, Ser. No. 370,395, now Patent No. 3,235,957, dated Feb. 22, 1966, which is a continuation of application Ser. No. 143,446, Oct. 6, 1961. Divided and this application July 12, 1965, Ser. No. 471,079
4 Claims. (Cl. 136—237)

This application is a division of my application, Ser. No. 370,395, filed May 20, 1964, now U.S. Patent 3,235,-957, assigned to the assignee of this application; Ser. No. 370,395 being a continuation of my application, Ser. No. 143,446, filed Oct. 6, 1961, now abandoned.

This invention relates to improved thermoelectric devices utilizing germanium-silicon alloy bodies with low sistance tungsten contacts.

Germanium-silicon alloys have been utilized for infrared detector devices, as described in United States Patent 2,953,529, issued Sept. 20, 1960, to M. L. Schultz and assigned to the same assignee as the instant application; for semi-conductor devices, as described in United States Patent 2,817,798, issued Dec. 24, 1957 to D. A. Jenny and assigned to the same assignee as the instant application; and for thermoelectric devices, as described in application Ser. No. 229,830, now U.S. Patent No. 3,279,-954, filed Nov. 11, 1962, and assigned to the assignee of this application. In these and other devices, it is frequently necessary to make mechanically strong but low electrical resistance contacts to the germanium-silicon alloy bodies. Such contacts have been relatively difficult and expensive to make by the methods of the prior art, and tend to exhibit low conductivity when their mechanical strength is high, or low mechanical strength when their conductivity is high. Part of the difficulty is that the thermal expansion coefficient of most contact materials is different from that of germanium-silicon alloys.

It is therefore an object of the instant invention to provide improved materials for making low resistance electrical contacts to germanium-silicon alloy bodies.

Another object of the invention is to provide improved materials for obtaining thermostable mechanically strong contacts to thermoelements composed of germanium-silicon alloys.

Still another object of the invention is to provide germanium-silicon alloy bodies with contacts having about the same thermal coefficient of expansion as the bodies.

Yet another object of the invention is to provide a low resistance electrical connection between a tungsten body and a thermoelectric component which consists of germanium-silicon alloys.

It has unexpectedly been found that a germanium-silicon alloy body can be bonded to a tungsten body by contacting the two bodies in a non-oxidizing ambient while applying heat. The bond thus formed between the germanium-silicon alloy body and the tungsten body is inexpensive, easily fabricated, mechanically strong, unaffected by elevated temperatures, and exhibits a surprisingly low electrical resistance.

The invention and its advantages and features will be described in greater detail by the following examples, in conjunction with the accompanying drawing, in which:

FIG. 1 is a cross-sectional view of a germanium-silicon alloy body being bonded to a tungsten body according to one embodiment of the invention;

FIG. 2 is a cross-sectional view of a germanium-silicon body in the process of being provided with a mechanically strong low-resistance bonded contact on each of two opposing faces according to another embodiment of the invention;

FIG. 3 is a cross-sectional view of a thermoelectric Seebeck device according to the invention;

*Example I*

Figure 4:
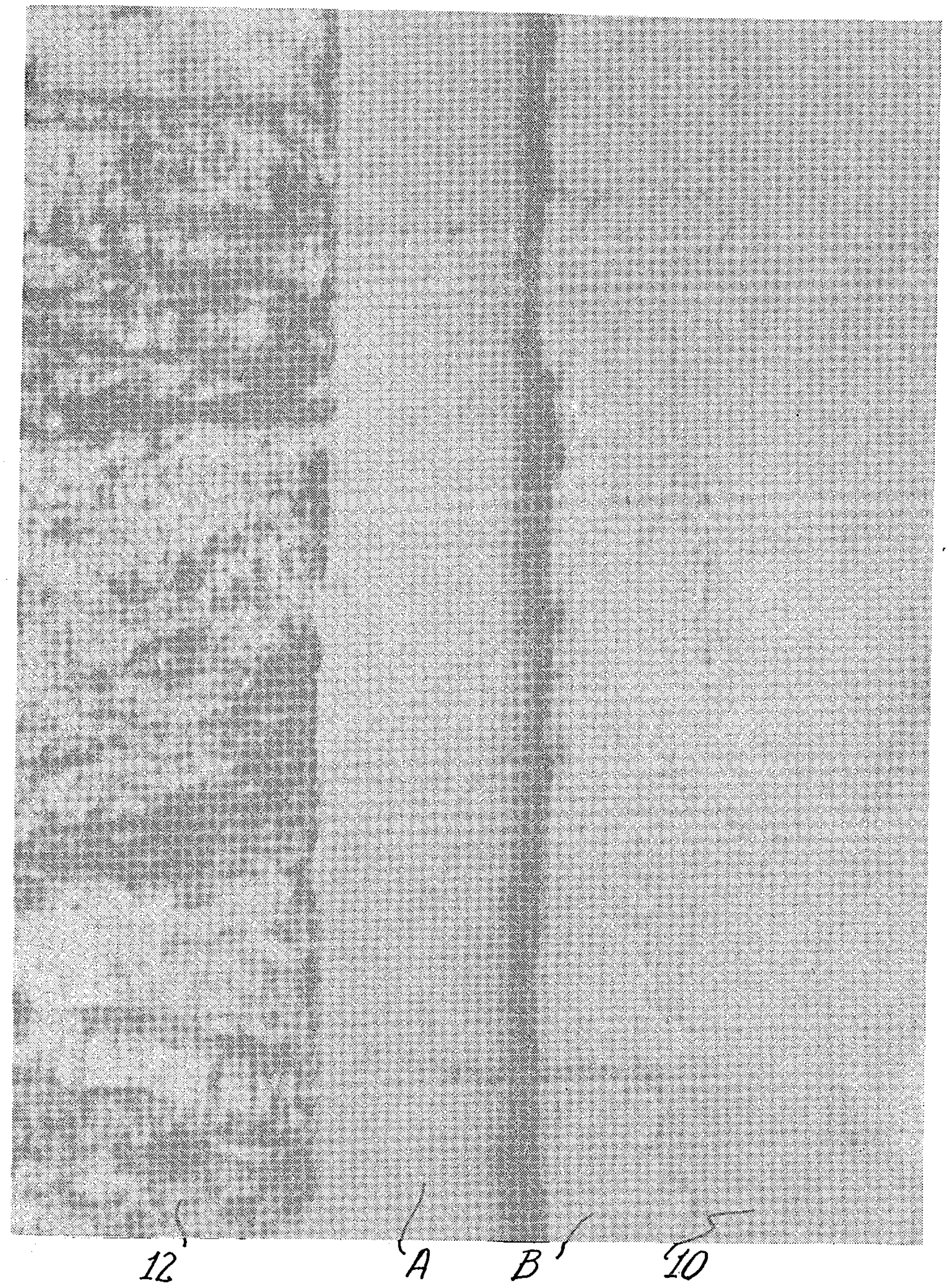
FIG. 4 is a photomicrograph of a cross section of the bond area of a bonded assembly such as that of FIG. 1.

In this example, a germanium-silicon alloy body 10 is contacted to a tungsten body 12 as illustrated in FIG. 1. The germanium-silicon alloy body 10 may be either polycrystalline or monocrystalline. The exact composition of the germanium-silicon alloy is not critical, and may, for example, consist of 25–50 atomic percent germanium, balance (75–50 atomic percent) silicon. The germanium-silicon body 10 may be either intrinsic or extrinsic, p-type or n-type, lightly doped or heavily doped. The exact size and shape of germanium-silicon body 10 is not critical. In this example, body 10 is in the form of a wafer about ¼ inch square and about 1/16 inch thick, and consists of monocrystalline n-type germanium-silicon alloy containing 25 atomic percent germanium and 75 atomic percent silicon. The tungsten body 12 in this example is of the same size and shape as the germanium-silicon body 10. Preferably the mating surfaces of the two bodies are flat.

The germanium-silicon body 10 may be pressed against the tungsten body 12 by any convenient method. Very little pressure is required. The upper limit of the pressure that can be applied is that pressure which would deform the germanium-silicon body. Moderate pressures in the range of about 1 to 200 lbs. per square inch on the mating surfaces between the two bodies have been found satisfactory in practice. The pressure may be applied in a convenient and simple manner by placing a weight 11 on the germanium-silicon body 10 as shown in FIG. 1. A suitable material for weight 11 is stainless steel, since this material is not affected by the subsequent heating step.

The assemblage of germanium-silicon body 10, weight 11 and tungsten body 12 is then heated in a non-oxidizing ambient to a temperature of about 1000–1100° C. The exact heating profile utilized does not appear to be critical in the practice of the invention. Heating of the assemblage for about 30 minutes has been found satisfactory. The non-oxidizing ambient utilized may consist of a reducing gas such as hydrogen or forming gas (1 volume $H_2$ and 9 volumes $N_2$), or an inert gas such as argon. Non-oxidizing ambients are utilized in order to prevent any undesirable side reactions such as oxidation of the germanium-silicon body. Such side reactions can also be prevented by performing the heating step in a vacuum furnace at residual atmospheric pressures of about $2\times10^{-4}$ torr, since the amount of oxygen remaining in the furnace atmosphere at this reduced pressure is insufficient to injure the germanium-silicon body by undesirable side reactions. A vacuum may thus be regarded as a non-oxidizing ambient. In this example, the assemblage of weight 11, germanium-silicon body 10 and tungsten body 12 is heated in a furnace (not shown) to about 1100° C. in an atmosphere of non-oxidizing gas for about 30 minutes. The assemblage is then cooled to room temperature in the non-oxidizing ambient, and removed from the furnace.

It has been found that the bond thus formed between the tungsten block or body 12 and the germanium-silicon body 10 is very strong mechanically, has low electrical and thermal resistance, and remains stable even after prolonged heating in vacuum at temperatures as high as 650° C.

Although the method of making the bond or joint between the germanium-silicon body 10 and the tungsten body 12 was known by me, the exact nature of the bond itself was not known at the time my application Ser. No. 143,446 was filed. However, microscopic examination of a cross-section of the joint area had shown a thin layer of new substances or phases which had formed in the contact area between the tungsten body 12 and the germanium-silicon body 10. This layer appeared to contain elements of the original materials, and was firmly joined to each of the original bodies. The microscopic examinations showed this layer to consist of two principal regions: (1) a distinctly delineated layer or zone A located directly next to the tungsten body 12; and (2) a less distinctly delineated layer or zone B between the distinct layer A and the germanium-silicon body 10. The layer B showed indications of having been partly molten. FIG. 4 is a photomicrograph of a polished cross section of such a bond, clearly showing the tungsten body 12 on the left, the germanium-silicon body 10 on the right, and the two intermediate layers A and B.

It is now definitely known that the bond between the bodies 10 and 12 is the result of a chemical reaction. Detailed analysis has revealed the structure of the bond and the nature of the process by which it is formed. Conventional X-ray analyses showed that the distinct layer A next to the tungsten body is tungsten disilicide ($WSi_2$).

Figure 5:
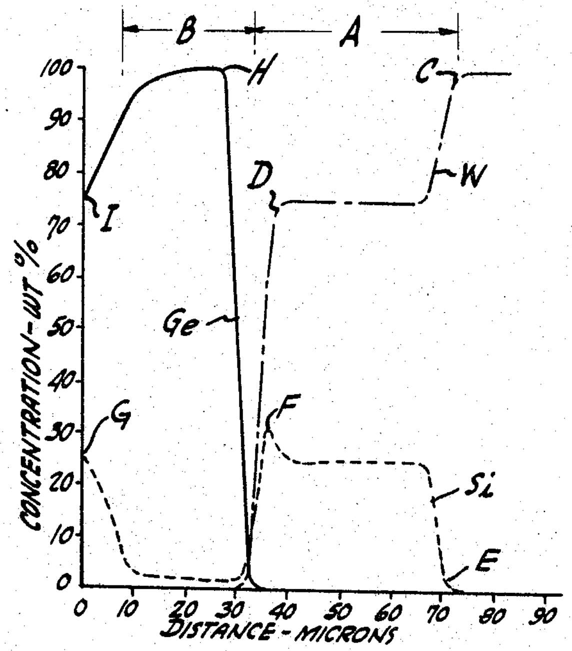
FIG. 5 is a graph showing the concentration of the various chemical elements in a bond similar to that shown in FIG. 4.

A more detailed analysis has been made by the use of an electron beam probe method. In this method, the concentration of one or more elements is measured by focusing a small beam of electrons on the spot to be analyzed and observing the resultant X-radiation. By taking a series of such "snapshots" across the bond, for the three elements, silicon, germanium and tungsten, a detailed picture was obtained of the chemical composition of the bond. FIG. 5 shows the results of such an electron beam probe analysis of a bond between a tungsten body 12 and a body 10 of 55% germanium and a 45% silicon (weight percent). The graph shown contains three curves, marked Si, Ge and W, showing the changes in the concentration of the three elements as the bond is traversed. Tracing the curves from right to left, corresponding to travel across the bond in FIG. 4 from left to right, starting in the tungsten body 12 and ending in the Ge-Si alloy body 10, one observes the following:

(1) The tungsten curve starts at the 100% level in the pure tungsten shoe 12. At point C, it begins a sharp descent to about 75%, which corresponds to the tungsten concentration in $WSi_2$, and is horizontal through the silicide layer A. At point D, corresponding to the interface between the two intermediate layers A and B of the bond, the tungsten curve drops sharply to zero, showing that the second more diffuse layer B does not contain appreciable tungsten.

(2) The silicon curve starts with zero concentration on the right, and increases sharply at point E, corresponding to point C, to about 25% silicon in the tungsten disilicide layer A. The curve is horizontal across layer A, rises somewhat at point F, and then drops sharply almost to zero at the interface between layers A and B. Then, the silicon content remains low over the major portion of layer B, followed by a gradual rise to about 25%, at point G where the probing was discontinued.

(3) The germanium curve starts at zero at the interface between layers A and B, climbs steeply to almost 100% at point H, is nearly horizontal over the major point of layer B, and then gradually drops to about 75% at point I, corresponding to point G.

The electron beam probe results shown in FIG. 5 not only confirm the presence of the tungsten disilicide layer A but also explain the nature of the less clearly delineated layer B. It is evident that, in the formation of the bond, some of the tungsten of body 12 combines with some of the silicon of alloy body 10 to form a layer of tungsten disilicide. But tungsten does not combine with germanium to form tungsten germanide. Therefore, since silicon is removed from the germanium-silicon alloy in the reaction, the alloy layer B next to the silicide layer A becomes enriched in germanium, sometimes to pure germanium.

Figure 6:
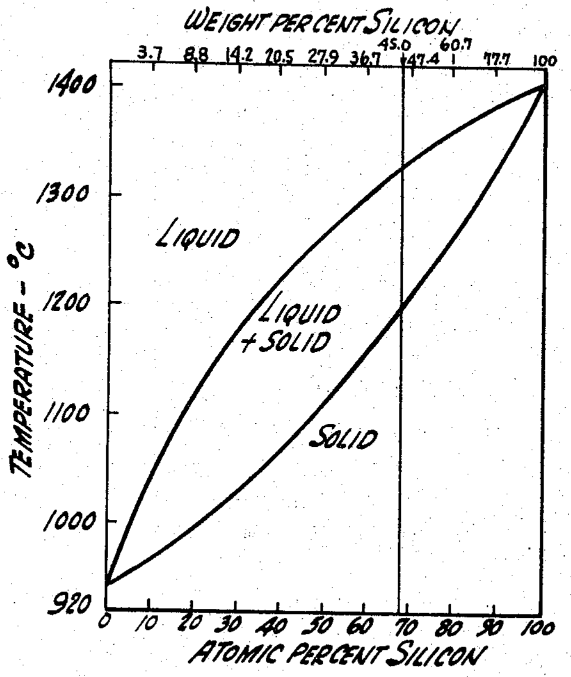
FIG. 6 is a graph containing the phase diagram for the binary system silicon-germanium.

It can be seen from the silicon-germanium phase diagram, shown in FIG. 6, that the melting temperatures of silicon-germanium alloy compositions decrease with smaller percentages of silicon in the composition. This explains the molten nature of the germanium rich layer B. That is, by depleting the original silicon-germanium alloy composition of silicon, at least a portion of the resulting germanium-rich layer B becomes molten or partially molten during the heating step.

Since the bond between the tungsten body 12 and alloy body 10 is produced by a chemical reaction, it is necessary that the bodies be held in contact at the reaction temperature. Any pressure that is sufficient to maintain contact, but below a value that would deform the alloy body, is satisfactory. Thus, the pressure may be as low as a fraction of a pound per square inch or as high as several hundred p.s.i. Pressures of 1 to 2 p.s.i. are now being used satisfactorily. It appears that a bond will be formed as soon as a complete layer of $WSi_2$ is present, even if it is only of the order of 0.1 mil thick. However, a thickness of 1 to 2 mils is preferred.

*Example II*

If desired, a tungsten block or body may be bonded to opposite ends or faces of the germanium-silicon body, thus making a plurality of low-resistance contacts to the germanium-silicon body, as described below.

In this example, the germanium-silicon body 20 (FIG. 2) is disc shaped, polycrystalline, of p-type conductivity, and consists of 50 atomic percent germanium–50 atomic percent silicon. This corresponds to about 72.1 percent germanium and 27.9 percent silicon, in weight percent. The germanium-silicon body is sandwiched between two tungsten bodies 22 and 24. Conveniently, tungsten bodies 22 and 24 are discs of the same thickness and diameter as the germanium-silicon body 20.

The tungsten-semiconductor-tungsten sandwich thus assembled is placed in a suitable clamp or press 60. While more elaborate jigs may be utilized, if available, the simple differential expansion clamp 60 illustrated in FIG. 2 has been found satisfactory. This expansion clamp 60 comprises two thermal expansion members 23 and 25 which press against tungsten bodies 22 and 24, respectively. The two expansion members 23 and 25 are urged toward each other by steel cross bars 27 and 29, respectively. Cross bars 27 and 29 are held together by a pair of bolts 26 and 28. A nut 21 at each end of bolts 26 and 28 is used to adjust the pressure exerted by thermal expansion members 23 and 25 against the tungsten-semiconductor-tungsten sandwich. While stainless steel is preferred for the thermal expansion members 23, 25 the remaining parts of this expansion clamp 60 may be made of ordinary steel.

The assemblage of the germanium-silicon body 20, the two tungsten bodies 22 and 24, and the differential expansion clamp 60 holding them is next heated in a vacuum furnace (not shown) at a temperature of about 1000° C. for about 30 minutes. The residual atmospheric pressure within the furnace is maintained at about $2 \times 10^{-4}$ torr. During the heating step the two stainless steel members 23 and 25 expand more than the steel rods 26, 28 and thereby increase the pressure between the two tungsten bodies 22 and 24. Pressures as high as necessary are thus easily attained.

The assemblage is next permitted to cool at room temperature and then removed from the furnace. When the tungsten-semiconductor-tungsten sandwich is removed from the expansion clamp 60, it is found that the components of the sandwich have been firmly joined together. The bond between each tungsten body 22 and 24 and the germanium-silicon body 20 is mechanically strong, exhibits low thermal and electrical resistivity and is stable over prolonged periods of time despite repeated cycling in vacuum to temperatures as high as 650° C.

*Example III*

The method of the invention may also be utilized to fabricate thermoelectric devices, as described in the following example.

Thermoelectric devices for converting heat energy directly to electrical energy by means of the Seebeck effect generally comprise two thermoelectric bodies as thermoelectric circuit members or components. The two thermoelectric bodies, also known as thermoelements, are bonded at one end to a block of metal so as to form a thermoelectric junction. The two thermoelectric bodies are of opposite thermoelectric types, that is, one thermoelement is made of P-type thermoelectric material and the other of N-type thermoelectric material. The designation of a particular thermoelectric material as N-type or P-type depends upon the direction of current flow across the cold junction of a thermocouple formed by the thermoelectric material in question and a metal such as lead, when the thermocouple is operating as a thermoelectric generator according to the Seebeck effect. If the current direction in the external circuit is positive toward the thermoelectric material then the material is designated "P-type"; if the current direction in the external circuit is negative toward the thermoelectric material, then the material is designated as "N-type." The present invention relates to both P-type and N-type thermoelectric germanium-silicon materials generally.

The two thermoelectric bodies should have a low electrical resistivity, since the Seebeck EMF generated in a device of this type is dependent upon the temperature difference between the hot and cold junctions of the device. The generation of Joulean heat in a thermoelectric device due to the electrical resistance of either thermoelement, or to the resistance of the electrical contacts on either thermoelement, will reduce the efficiency of the device. The presence of high resistance contacts on the thermoelements has been a serious problem in the fabrication of both Seebeck and Peltier thermoelectric devices. High resistance contacts have reduced the cooling effect of Peltier devices as much as 40% below the theoretical maximum value.

Referring to FIG. 3, the thermoelectric device 50 for the direct conversion of thermal energy to electrical energy by means of the Seebeck effect comprises a P-type thermoelectric body of thermoelement 30, and an N-type thermoelectric body or thermoelement 40. The two thermoelements 30 and 40 are conductively joined at one end to a metal plate 35. The other end of each of the thermoelements 30 and 40 is bonded to electrical contacts 32 and 42, respectively. Contacts 32 and 42 are preferably metallic blocks or bodies to which electrical lead wires 34 and 44 respectively may be readily attached. For highest efficiency in the conversion of heat to electricity by the Seebeck effect, the electrical resistance between each thermoelement (30 and 40) and metal plate 35, and the electrical resistance between each thermoelement and its respective contact (32 and 42) should be minimized.

In the operation of device 50, the metal plate 35 and its junctions to the thermoelements 30 and 40 is heated to a temperature $T_H$ and becomes the hot junction of the device. The metal contacts 32 and 42 on thermoelements 30 and 40, respectively, are maintained at a temperature $T_C$ which is lower than the temperature $T_H$ of the hot junction of the device. The lower or cold junction temperature $T_C$ may, for example, be at room temperature. A temperature gradient is thus established in each thermoelement 30 and 40 from a high temperature $T_H$ adjacent plate 35 to a low temperature $T_C$ adjacent contacts 32 and 42, respectively. The electromotive force developed under these conditions produces in the external circuit a flow of (conventional) current (I) in the direction shown by arrows in FIG. 3; that is, the current flows in the external circuit from the P-type thermoelement 30 toward the N-type thermoelement 40. The device is utilized by connecting a load $R_L$, shown as a resistance 37 in the drawing, between the lead wires 34 and 44 which are attached to contacts 32 and 42 of thermoelements 30 and 40, respectively.

The thermoelectric bodies of thermoelements 30 and 40 each may consist of a germanium-silicon alloy containing 25–50 atomic percent germanium. In this example, both of the two thermoelectric bodies 30 and 40 consist of polycrystalline germanium-silicon alloys containing 50 atomic percent germanium. Thermoelement 30 contains an excess of acceptors so as to be P-type, while thermoelement 40 contains an access of donors and hence is N-type. The metal plate 35, and the two metal bodies 32 and 42 which are bonded to thermoelements 30 and 40, respectively and serve as low resistance contacts thereto, are all made of tungsten. If desired, the tungsten contacts 32 and 42 may first be bonded to one end of the thermoelements 30 and 40, respectively in the manner described in Example I above, and then the other end of the thermoelements 30 and 40 bonded to plate 35 in a second and subsequent operation. Alternatively, the plate 35, thermoelements 30 and 40 and contacts 32 and 42 may all be positioned in a jig or clamp in a manner similar to that described in Example II above, and then the entire assemblage heated in a vacuum furance or non-oxidizing ambient so as to bond or fuse the tungsten bodies (32, 35 and 42) to the germanium-silicon bodies (30 and 40) in a single operation.

The Seebeck device 50 thus fabricated combines a number of important advantages. First, the thermoelectric device 50 can be operated at elevated temperatures. In the prior art, when solder was used to bond the thermoelements 30 and 40 to metal plate 35 and metal contacts 32 and 42, the melting point of the solder was necessarily sufficiently low so as not to injure the thermoelements. Subsequently such prior art thermoelectric devices could not be operated at temperatures high enough to soften the solder. This is a serious limitation, as the thermoelectric device 50 may be regarded as a heat engine, and hence for a high Carnot efficiency requires a large temperature difference between the hot and cold junctions. Since the cold junction is generally at room temperature, the hot junction temperature should be as high as possible for maximum efficiency. In the device 50 of this example, there is no low-melting solder, and the tungsten bodies utilized as contacts can withstand very elevated temperatures. Hence the only limitation on the hot junction temperature for the device 50 is that imposed by the melting point of the enriched germanium zone B of the germanium-silicon alloy.

Second, the bonds or joints between the germanium-silicon bodies (30 and 40) and the tungsten bodies (32, 35 and 42) in the device 50 are mechanicaly very strong. A bond thus formed was not broken when shock tested under acceleration of 100 g. The best bonds in the device 50 are obtained when the silicon-germanium ratio is chosen such that a good match exists between the thermal coefficient of expansion of the germanium-silicon body and that of the tungsten bodies. Such a match is obtained with an alloy containing about 70 atomic percent silicon.

Third, the electricl resistance between the germanium-silicon bodies or thermoelements (30 and 40) and the tungsten bodies (32, 35 and 42) of the device 50 is very low. The interface resistance between such thermoelements and their tungsten contacts has been found too low to measure readily. As discussed above, such low resistance is very important to optimize the efficiency of the device.

Fourth, the bonds or joints between the germanium-silicon bodies and the tungsten bodies in these thermoelectric devices are thermostable. The devices such as 50 of Example III can be utilized for prolonged periods at elevated temperatures, or can be repeatedly cycled to elevated temperatures, provided the ambient of the device is non-oxidizing and the coefficients of thermal expansion are matched.

Fifth, the thermal resistance of the bonds or joints between the germanium-silicon bodies and the tungsten bodies of devices such as 50 is low. This feature of high thermal conductivity across the interface is desirable for optimization of the efficiency of the device.

It will be understood that the various embodiments described above are by way of example only and not limitation. Various modifications may be made without departing from the spirit and scope of the invention. For example, other jigs and clamps may be utilized to press together a germanium-silicon body and a tungsten body. Other non-oxidizing ambients such as nitrogen and helium may be utilized during the heating step.

What is claimed is:

1. A thermoelectric device comprising a thermoelectric body of germanium-silicon alloy fused to a tungsten contact body by a low resistance bond consisting essentially of layers of tungsten disilicide and a germanium-silicon alloy containing a higher percentage of germanium than said thermoelectric body.

2. A theromelectric device as in claim 1 wherein said thermoelectric body contains at least 50 atomic percent silicon.

3. A low resistance bond between a germanium-silicon alloy body and a tungsten body consisting essentially of, in order between said alloy body and said tungsten body, a zone of germanium-silicon alloy containing a higher percentage of germanium than said alloy body, and a zone of tungsten disilicide.

4. A low resistance bond as claim 3 wherein said germanium-silicon alloy body contains at least 50 atomic percent silicon.

References Cited

UNITED STATES PATENTS

| | | | |
|---|---|---|---|
| 2,597,752 | 5/1952 | Salisbury | 136—208 |
| 2,646,536 | 7/1953 | Benzer et al. | 29—486 |
| 3,000,085 | 9/1961 | Green | 29—194 X |
| 3,000,092 | 9/1961 | Scuro | 136—237 X |
| 3,151,949 | 10/1964 | Plust et al. | 29—195 |
| 3,164,892 | 1/1965 | Lieberman et al. | 136—239 X |
| 3,178,271 | 4/1965 | Maissel et al. | 29—195 |

FOREIGN PATENTS

| | | |
|---|---|---|
| 609,035 | 9/1948 | Great Britain. |

OTHER REFERENCES

Hansen, M. (ed.): "Constitution of Binary Alloys," 2nd ed., McGraw-Hill, 1958, pp. 779, 1203 and 1204.

Levitas: "Physical Review," vol. 99, No. 6 9–55, pp. 1810–14.

ALLEN B. CURTIS, *Primary Examiner.*

WINSTON A. DOUGLAS, *Examiner.*

A. M. BEKELMAN, *Assistant Examiner.*